United States Patent [19]

Handy

[11] 3,775,857

[45] Dec. 4, 1973

[54] SET-UP TOOL

[76] Inventor: Harry G. Handy, 1117 Mt. View Rd., El Cajon, Calif. 92021

[22] Filed: Aug. 30, 1971

[21] Appl. No.: 175,919

[52] U.S. Cl. .................. 33/185 R, 33/189, 408/115
[51] Int. Cl. ..... B23b 49/00, B27g 23/00, G01b 5/02
[58] Field of Search ...................... 33/185 R, 185 V, 33/201, 1 D, 174 H, 165, 189, 125 R, 174 TA, 174 TB, 170; 408/115, 72, 91, 115

[56] References Cited
UNITED STATES PATENTS

| 1,887,437 | 11/1932 | Schotthoefer | 33/185 R |
|---|---|---|---|
| 2,864,268 | 12/1958 | Anderson | 408/115 |
| 3,535,793 | 10/1970 | Williams et al. | 33/125 |
| 1,335,347 | 3/1920 | Moulds | 408/115 |

FOREIGN PATENTS OR APPLICATIONS

| 596,009 | 12/1947 | Great Britain | 408/115 |
|---|---|---|---|
| 738,152 | 7/1966 | Canada | 33/125 R |

Primary Examiner—Robert B. Hull
Assistant Examiner—Richard R. Stearns
Attorney—Carl R. Brown et al.

[57] ABSTRACT

A tool for layout and machining operations that incorporates an end plate for locating the tool with respect to a datum point, and beam means for slidably mounting a carriage for movement with respect to the datum point. The carriage is provided with means for fixing the carriage in relationship to a scale bar that contains a plurality of protruding locating balls. The carriage is located with respect to a ball thereby determining the incremental position of the carriage along the beam. Fine adjustment of the carriage position is accomplished by movement of the scale bar within the beam and thereby the movement of the carriage affixed thereto. This movement is measured by a standard micrometer. The carriage contains provision for receiving bushings or other means for locating a point at which machining is required and thereafter receiving a tool bit for accomplishing the machining operations.

11 Claims, 8 Drawing Figures

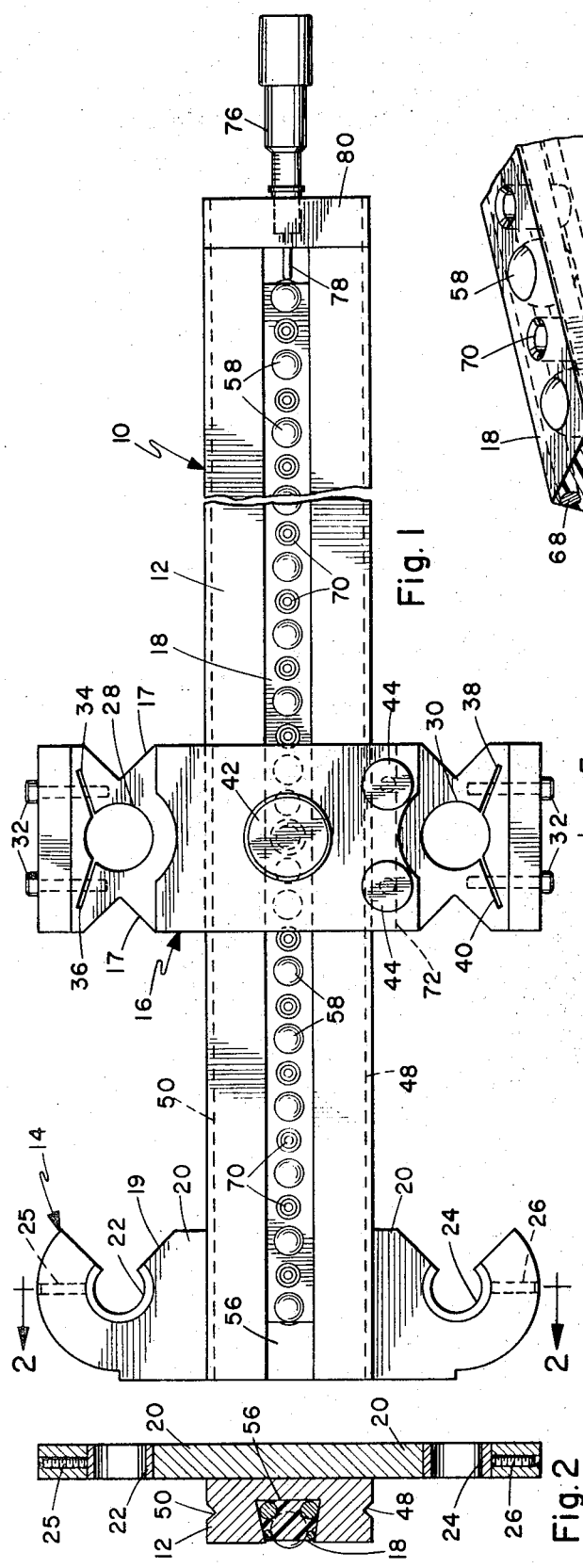
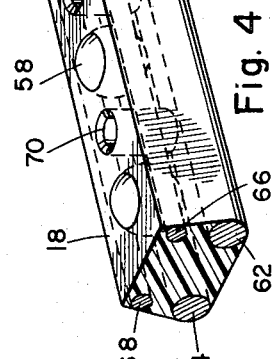
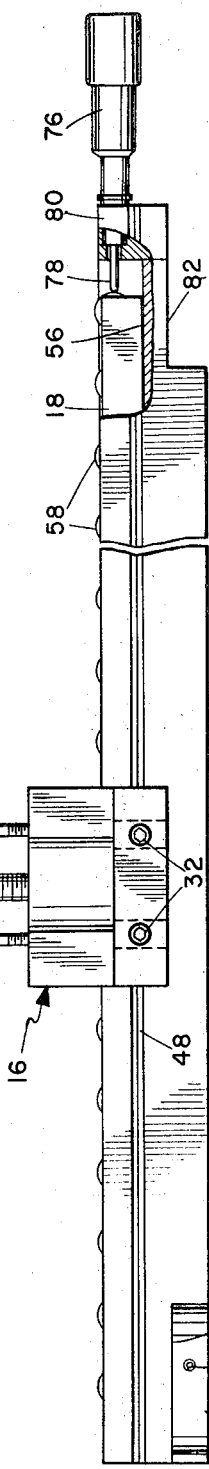
INVENTOR.
HARRY G. HANDY
BY Brown & Martin
ATTORNEYS

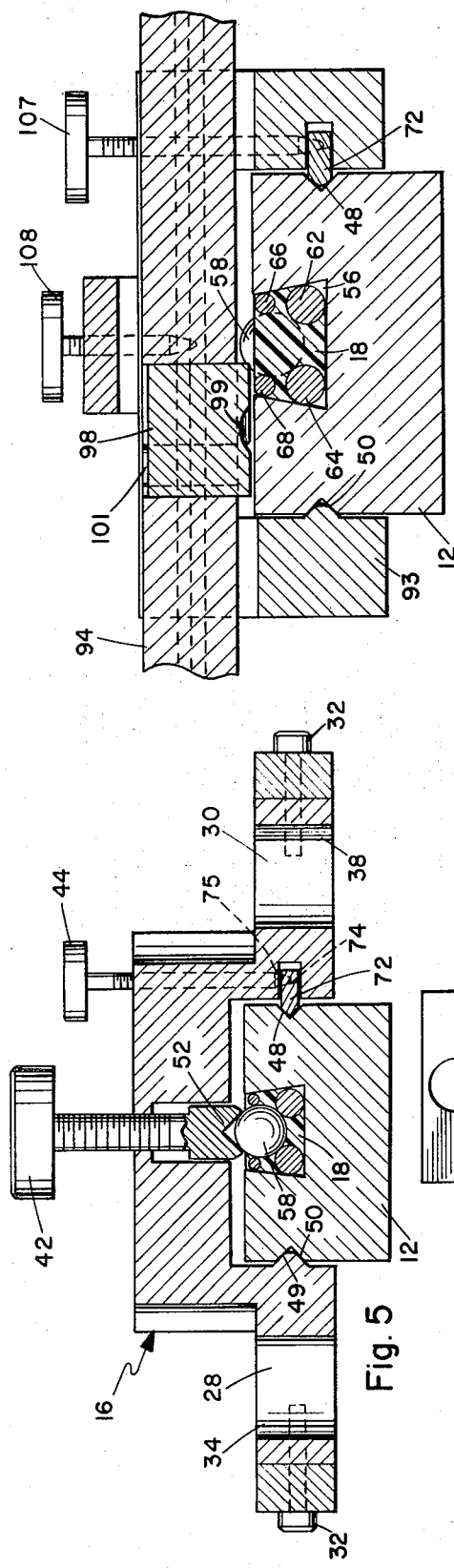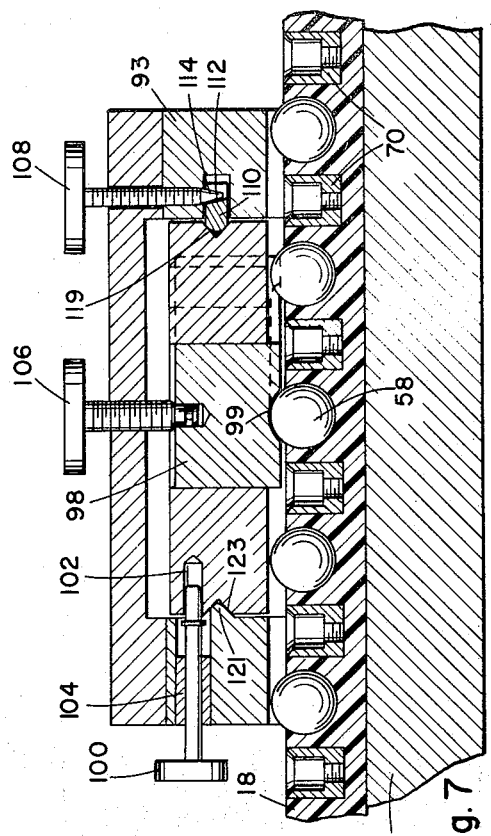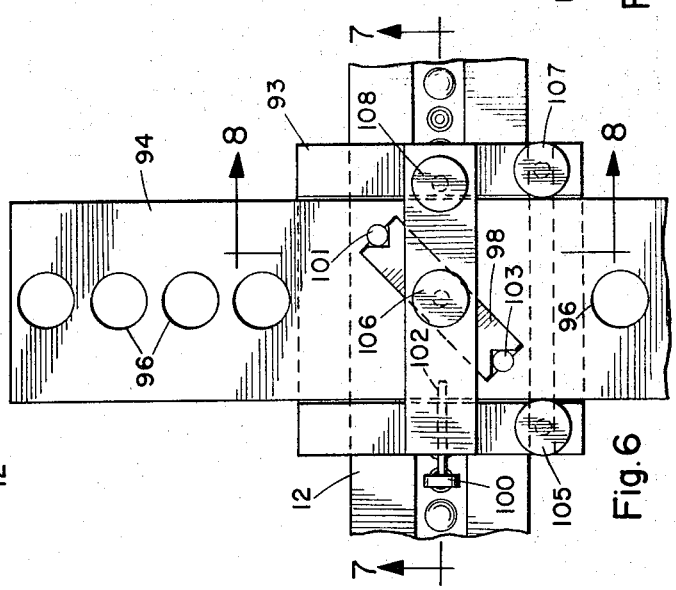

SET-UP TOOL

BACKGROUND OF THE INVENTION

Machining operations frequently account for a significant portion of the total cost of the products. Even those products which do not themselves have any machined surfaces, frequently require tooling that has had machining during its manufacture. In recent years, considerable attention has been given to reducing the overall cost of products requiring machining, by automating or otherwise reducing the labor attendant to the actual machining operation. Thus, numerically controlled machines, and other automatic or semi-automatic machine tools, have been developed in recent years. These tools do not, of themselves reduce the labor attendant to the set-up of the part for machining, and are adaptable only to high volume operations where the capital investment can be amortized over a large number of parts.

For low production parts, such as the manufacture of tooling jigs and similar associated parts, as well as other relatively low volume production parts, the techniques employed are very little different today, than they have been for many years in the past.

In setting up a part, for example, a metal plate for machining, the part is first placed on a planar surface and then some form of measuring device is employed to locate a datum point and the other holes or machine surfaces from that datum point. Such a device may be referred to as an indexing and layout jig and is used to mark or otherwise locate the holes and surfaces to be machined. Normally, all of the required points would be located by this process, requiring frequent reference to trigonometric tables and other reference material, until the entire surface had been marked with the points out at which machining was required. After this operation is complete, the part is then moved to an appropriate machine tool and positioned so that the tool bit may engage the located point. For example, where drilling is required the part would be moved to a drill press, and the holes drilled. Similarly routing operations or milling operations would be accomplished by moving the part to the routing or milling machine and performing the operations as necessary.

The techniques employed in the prior art, for machining of parts are difficient in several respects. In the first instance the techniques are very highly labor intensive, and require the use of multiple skills in setting up a part for machining. A second manner in which the prior art techniques are deficient is that they employ jigs, or other set-up techniques that are susceptible to accumulating errors during the layout process, so that it is difficult to hold a close tolerance for all of the locations. Additionally, these prior art techniques often require the use of expensive machines and require that the part be transported to a plurality of such machines.

Thus it would be desirable if a tool could be produced which would facilitate the layout and machining of parts in an accurate manner, with a minimum amount of labor, and without expensive machine tools.

SUMMARY OF THE INVENTION

The improved set-up tool of the invention satisfies the need existing in the art by providing a device that may be utilized for both layout and machining operations. The device is inherently precise and is not susceptible to an accumulation of errors. In addition, the device has provisions for attachment of simple machine tools, and is sufficiently rugged so that it may be used in association with those machine tools, to conduct the desired machining operations, without the necessity of removing the part from its set-up location. In an exemplary embodiment of the invention, there is provided an elongated beam means that carries a datum means or end plate, with a plurality of bushings for receiving locating pins. The end plate is fixed at one end of the beam means whereas a carriage means is mounted on the beam means for relative movement therewith. The carriage means may be locked in any position along the beam and also contains provision for establishing the spacial relationship of the carriage means to a scale bar. The scale bar is located in a recess or slide in the upper portion of the beam means and is movable with respect to the beam along the slide.

The scale bar contains a plurality of spaced locating balls that have their upper surfaces exposed above the surface of the scale bar. Thus, it is possible to move the carriage means along the beam means, until the portion of the carriage means engageable with the scale bar, is positioned over an exposed locating ball. The carriage may then be engaged with that ball, and thereafter the carriage means and scale bar will move together. One end of the scale bar is engageable by a standard micrometer, and this micrometer is utilized to determine the precise position of the scale bar and therefore the carriage.

Thus, with the end plate fixed by a locating pin to a known datum point, the precise position of any point on the carriage may be determined. The carriage provides at least one locating hole for a bushing adapted to receive the rotating portion of a standard tool bit, and thereby determine the position of the tool bit in relationship to the work.

The set-up tool of the invention is rugged, and therefore can withstand the forces associated with machining operations, and it is therefore possible, for example, to drill a hole utilizing the bushing as a tool bit locating device and rotating the tool bit with, for example, a standard drill motor. For drilling operations, as well as other machining operations, it may be desirable to lock the carriage in position once it has been precisely located, and lock screws on the carriage are provided for this purpose. The lock screws cause a wedge to engage a V-groove in the sides of the beam, and thereby hold the carriage firmly in position during the machining operation.

For other machining operations, such as the production of a straight slot, it may be desirable to allow the carriage to be movable, after a pilot hole has been drilled, and therefore the lock screws would be left unengaged. The appropriate tool bit would be located in the bushing and the drill motor operated while the carriage is moved along its guided path so as to produce the straight slot desired.

A modified form of the invention incorporates an angularly related channel to move a cross slide at right angles to the elongated beam, to position a bushing precisely over any predetermined point, utilizing an arbitrary datum point. In utilizing this form of the invention, the cross slide is first located in a centered position through the use of a centering pin, and the carriage positioned longitudinally along the beam in the manner described previously. After the positioning has been accomplished, the carriage is locked in position by the lock screws and the centering pin released to allow movement of the cross slide. The angularly related channel translates movement of the cross slide into movement of the scale bar that can be recorded by the micrometer and the displaced position of any bushing location determined. The cross slide may be locked in its final position by a lock screw and the selected bushing receiving hole then utilized for the machine operation required.

It is therefore an object of the invention to provide a new and improved set-up tool.

It is another object of the invention to provide a new and improved set-up tool that reduces the labor required for set-up operations.

It is another object of the invention to provide a new and improved set-up tool that may be utilized for layout and machining operations.

It is another object of the invention to provide a new and improved set-up tool that is low in cost.

It is another object of the invention to provide a new and improved set-up tool that is highly accurate.

It is another object of the invention to provide a new and improved set-up tool that makes it possible to locate a point in two axes.

It is another object of the invention to provide a new and improved set-up tool that is easy to use by relatively unskilled persons.

It is another object of the invention to provide a new and improved set-up tool that is capable of facilitating multiple machining operations.

It is another object of the invention to provide a new and improved set-up tool that reduces the likelihood of error.

Other objects and many attendant advantages will become more apparent upon a reading of the following detailed description and an examination of the drawings, in which like reference numerals refer to like parts throughout and in which:

FIG. 1 is a top plan view of the set-up tool of the invention.

FIG. 2 is a sectional view taken along line 2—2 of FIG. 1.

FIG. 3 is a side elevation view of the set-up tool of the invention.

FIG. 4 is a perspective view of a portion of the adjustable scale bar.

FIG. 5 is an enlarged sectional view taken along line 5—5 of FIG. 3.

FIG. 6 is a top plan view showing an alternative cross slide carriage.

FIG. 7 is an enlarged sectional view taken along line 7—7 of FIG. 6.

FIG. 8 is an enlarged sectional view taken along line 8—8 of FIG. 6.

Referring now to the drawings, there is illustrated generally set-up tool 10 incorporating an elongated beam 12 having a datum means 14 mounted at one end thereof and carriage means 16 mounted on its upper surface for slidable movement along said beam. The beam also carries a scale bar 18 mounted for relative movement.

The datum means 14 comprises an end plate 20 protruding on both sides of the beam and mounting split bushings 22 and 24, which bushings may be compressed by screws 25 and 26 respectively to retain a device mounted therein.

A wedge shaped opening 19 leads to the opening in the split bushing and provides access to the immediate vicinity of the datum point for drilling and other operations. The carriage extends on either side of the beam and mounts bushing receiving holes 28 and 30 that may be utilized to receive locating means or bushings for use with rotating tool bits. The hole 28 has slots 34 and 36 in association therewith, and the hole 30 has slots 38 and 40 in association therewith, whereby the holes may be compressed to retain the bushings associated therewith, through the use of a plurality of screws 32. A scale bar locating screw 42 is threadably received in the carriage and contains a ball engaging portion 52 at the lower end thereof, whereby the relative positions of the carriage and the scale bar may be fixed. The relationship between the carriage and the beam is controlled by a wedge 72 that engages the V-groove 48 along one side of the beam, under the influence of locking screws 44 that are threadably received in the carriage, and have tapered lower end portions 75 that engage sloping surfaces 74 on wedge 72 to laterally force the wedge into engagement with the slot 48. The carriage is aligned by an integral wedge portion 49 which rides in a V-groove 50 along the other side of the beam.

The carriage includes a plurality of wedge shaped openings 17 that may be used to align the tool by drawing the carriage toward an index pin until the pin is received at the apex of the slot. The scale bar 18 is formed of a settable material such as epoxy, and contains within the settable material, a plurality of spaced spherical balls 58, resting on lower bar members 62 and 64 and engaging the upper bar members 66 and 68. The use of the bar members ensures the precise axial alignment of the ball and adds strength to the structure. The exterior configuration of the scale bar is trapezoidal and its short parallel leg is utilized for the upper surface of the bar, through which the balls 58 protrude. The slot 56 in the beam means has a similar, although slightly larger trapezoidal configuration, so that the bar is slidably received in the slot, but is not removable upwardly therefrom. Also embedded in the settable material, between alternate spaced balls, are a plurality of inserts 70 that may be threaded in their lower portions, and may be utilized for attaching accessories to the tool as will be described more fully hereinafter. The position of the balls along the length of the scale bar is determined, prior to the hardening of the setting material, by a jig fixture, manufactured for this purpose with the precise ball positions represented by a series of depressions, or other suitable recesses for locating the balls. In this manner, the position of each ball is precisely known relative to an end of the scale bar, and therefore there is no accumulation of errors between adjacent balls.

The fit between the scale bar and beam means is sufficiently loose to allow sliding movement of the scale bar relative to the beam means and this movement is controlled by a micrometer 76 that is mounted in an end plate 80 of the beam means and includes a ball engaging tip 78. The scale may be moved to a predetermined location, and its precise measurement determined by engaging the micrometer with the ball, or the micrometer may be rotated to move the scale. The beam incorporates cutout 82 and 90 so that additional beams may be joined together to produce a beam of any desired length.

A modified form of the invention is illustrated in FIGS. 6 through 8. In this form of the invention a carriage 93 mounts a cross slide 94 for movement transverse to the long axis of the beam means. The cross slide has a plurality of spaced holes 96 on both sides of the beam means suitable for receiving bushings and other attachments. The movement of the cross slide is controlled by an inset channel block 98 that engages a selected ball 58 through the channel 99. A 45 degree angular relationship between the channel and the channel block 98 and the long axis of the beam means is selected, and this angle is precisely determined through the use of guide pins 101 and 103 which secure the channel block in its precise angular position. The channel block is guided for vertical movement within the cross slide, and is engaged by threaded means 106 so that downward force on the channel block may be exerted. The centering pin 100 is received through a guide bushing 104 on the carriage and in a cavity 102 on the cross slide to lock the cross slide in its centered position. The carriage is positioned with the cross slide in this locked position, and secured to the beam by locking screws 105 and 107 in a manner similar to that illustrated in FIG. 5 for locking screw 44. After initial positioning, the centering pin may be removed and transverse movement of the cross slide induced by movement of the scale bar, which causes the selected ball 58 to engage the channel and cause transverse movement of the cross slide on a one to one ratio with movement of the scale bar. Thus it is possible to utilize the micrometer to measure both the movement along the beam axis and the movement transverse to the beam axis so that a precisely predetermined position may be obtained. The movement of the cross slide is limited by the capacity of the micrometer, and therefore a plurality of holes 96 are provided on centers spaced by less than the micrometers capacity, so that any point may be provided with a centered hole, for insertion of a bushing or other attachment. The cross slide incorporates a locking screw 108 engaging a locking wedge 110 having a sloping surface 112 that cooperates with the tapered end 114 of the locking screw to engage V-shaped groove 119 of the cross slide and hold it in position. The other side of the cross slide is guided by a protrusion 121 engaging V-shaped groove 123.

OPERATION

In use, the improved set-up tool of the invention is placed on the surface to be machined, and a datum point selected. If no hole exists at this datum point, a hole is drilled to provide a means of attaching a locating pin or other suitable means for fixing the tool to the datum point. Depending upon the relationship of the tool to the other parts of the work, either the left or right hand bushing may be selected for this purpose, and in some situations it may be desirable to fix the position of the tool by utilizing both points to ensure that the beam will not rotate. The index bushing is secured to the tool through the use of the screw 26 or 25 on the end plate. The carriage 16 is moved to the nearest inch position by reference to a conventional scale imprinted or otherwise affixed to the surface of the beam. This scale, not shown, will determine which of the balls 58 will be engaged by the carriage locating screw 42 with its associated mating surface 52. For ease of usage it may be desirable to space the balls by 1 inch intervals. With this arrangement the operator, given a requirement for drilling a hole 9.950 inches from datum, would slide the carriage until it was positioned over the tenth ball. It should be noted that it is not necessary to zero the micrometer at this point since it is only necessary to position the carriage accurately within one inch. Because the spherical ball and cooperating mating surface have inherent centering characteristics, the engagement of the locating screw 42 ensures that the carriage will be precisely positioned with respect to the balls. As was earlier described, the precise position of the balls from the end of the scale bar is known and it is therefore necessary only to utilize the micrometer to add the incremental movement necessary to position the carriage at the preselected location. When the final position is reached, the locking screws 44 will be utilized to cause the carriage to become fixed with relationship to the beam means and thus the distance between the bushing hole 30 for example, and the bushing 24, will be precisely known. With the distance established it is then necessary to only insert a proper tool bushing and tool bit, whereupon a conventional drill motor may be used to power the tool bit and perform the machining operation. For example, if it is required to drill a hole at the previously mentioned 9.950 inch distance, the carriage would be locked in that position and the bushing corresponding to the outside diameter of the drill inserted in the carriage. Then the drill would be lowered through the bushing and guided by it onto the work surface. The drill motor would be activated and cause a precisely located hole to be drilled. In other operations, it may be desirable to utilize a tool with provision for locating a point in two axes from a predetermined beam rotational orientation. The modified form of the invention would be utilized in these circumstances and the cross slide carriage would be substituted for the conventional carriage to permit adjustment in two axes. In a typical set-up utilizing the cross slide, it would be determined, using well known trigonometric techniques, what the linear distance along the beam axis would be for any selected point. If for example, this point was determined to be 8.72 inches from datum, then the eighth ball would be selected and the micrometer used to move the carriage back a distance corresponding to 0.72 inches. The carriage would then be locked with respect to the beam and the centering pin retracted to allow movement of the cross slide. The closest hole 96, to the final position for machining operations would be selected and the micrometer then operated an additional amount in either direction as necessary, to cause movement of the cross slide the distance necessary to place the center of the appropriate hole directly over the point to be machined.

The tool of the invention is usable for other than drilling operations and may be, for example, used to produce straight or curved slots, or mill the edges of material. To accomplish this operation, the beam may be rotated about the datum point of the carriage and the cross slide moved along and across the track. Movement of the carriage during a machining operation may be facilitated through the use of the inserts 70. The insert may, for example, receive a threaded end of a cam like device, capable of bearing up against the edges of the carriage, and causing the carriage to move linearly along the beam as the cam device is rotated, thereby creating a radial slot with the use of a simple drill motor and appropriate cutting tool.

Having described my invention, I now claim:

1. An improved set-up tool for laying out and machining operations comprising:
   beam means comprising an elongated member for supporting and guiding a carriage means for movement along said beam means;
   datum means comprising at least one end plate extending from said beam means adjacent an end thereof for fixing the position of said tool around a reference point;
   scale bar means comprising an elongated member received on said beam means for movement relative to said beam means,
   said scale bar means including a plurality of equally spaced spherical balls positioned within said scale bar means and protruding from the upper surface of said scale bar means,
   said carriage means mounting means for securably engaging a selected one of said spherical balls,
   said means for measuring the distance between an end of said scale bar means and an end of said beam means.

2. The improved set-up tool of claim 1 wherein:
   said beam means has a scale bar means receiving recess extending longitudinally along the upper surface of said beam means,
   said recess and said scale bar means being substantially trapezoidal in cross section.

3. The improved set-up tool of claim 1 further including:
   micrometer means for setting the position of said scale bar means and said carriage means relative to said beam means in smaller units of distance than the spacing between said spherical balls.

4. The improved set-up tool of claim 3 wherein:
   a portion of the end ball in said scale bar means protrudes from the end of said scale bar means to be engaged by said micrometer means.

5. The improved set-up tool of claim 1 further including:
   a plurality of threaded inserts mounted in said scale bar means between each of said spherical balls.

6. The improved set-up tool of claim 1 wherein:
   said carriage means carries a cross slide means for positioning of an index point in two perpendicular axes lying in a plane parallel to the long axis of said beam means.

7. The improved set-up tool of claim 6, wherein:
   said cross slide means comprises a channel block on said carriage means;
   said channel block having a downwardly opening channel oriented at a 45° angle to the long axis of said beam means.

8. The improved set-up tool of claim 7 further including:
   centering pin means comprising an elongated pin for locking said cross slide means into a position where it is centered on said carriage means.

9. The improved set-up tool of claim 2 wherein:
   said scale bar means comprises four elongated round bars positioned at the corners of said trapezoidal scale bar means configuration;
   each of said round bars engaging all of said plurality of spherical balls.

10. The improved set-up tool of claim 1 wherein, said datum means comprises split bushing means for receiving locating means for securing said tool at a predetermined point.

11. The improved set-up tool of claim 1 wherein, said carriage means comprises means for holding tool bit receiving bushings.

* * * * *